Nov. 6, 1934.  H. BÉNIT  1,979,440

STORAGE BATTERY CHARGING SYSTEM

Filed June 10, 1932

Inventor.
Henri Bénit
By Raymond A. Robie
Attorney

Patented Nov. 6, 1934

1,979,440

UNITED STATES PATENT OFFICE 1,979,440

STORAGE BATTERY CHARGING SYSTEM

Henri Bénit, Paris, France, assignor to Compagnie Generale D'Electricite, Paris, France Application June 10, 1932, Serial No. 616,504
In Germany June 26, 1931

3 Claims. (Cl. 171—314)

In a previous application filed September 18, 1930 under Serial No. 482,912, I have described an automatic charging device for storage batteries, at decreasing current intensity and predetermined charging period, and comprising a direct current generator connected in circuit with the batteries to be charged. This automatic charging arrangement included a voltage regulating device for the generator and varying the voltage thereof as a function of the time, during the charging period, and a time switch opening the charging circuit at the end of the time set for charging. I have described as a specific embodiment an arrangement comprising a compound dynamo, a regulating rheostat in the shunt excitation of this dynamo, a clockwork actuating the said rheostat in order to eliminate its resistances in a progressive and continuous manner, during the time period predetermined for charging, and a time switch opening the charging circuit at the end of the time set for charging.

The present invention enables the automatic charging of storage batteries, at decreasing current intensity and predetermined charging period, according to the same principle as stated above, in the case where the available charging source is of constant voltage direct current: a network for example. The invention consists in inserting in series with the network an auxiliary source and is characterized by the fact that the tension of this source is automatically regulated, in order to vary as a function of the time during the charging period, a time switch opening the charging circuit at the end of the time set for charging.

Figure 1:
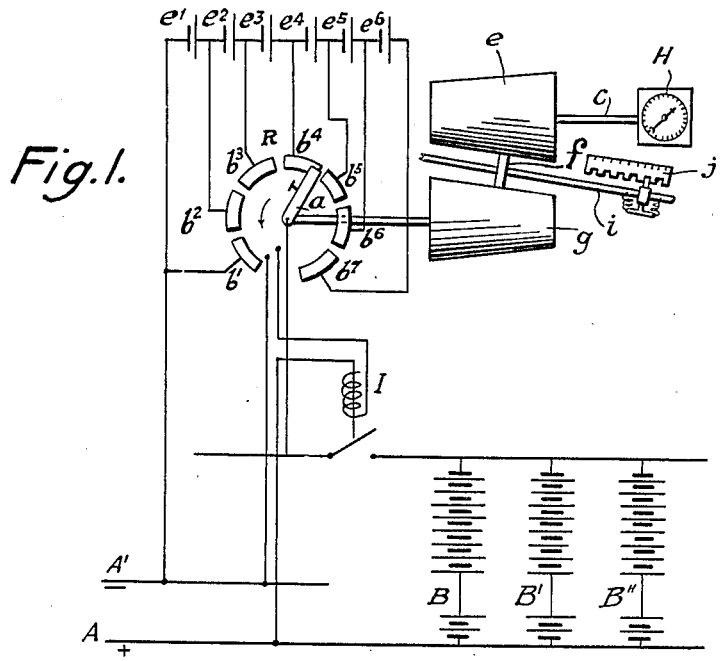
Figure 2:
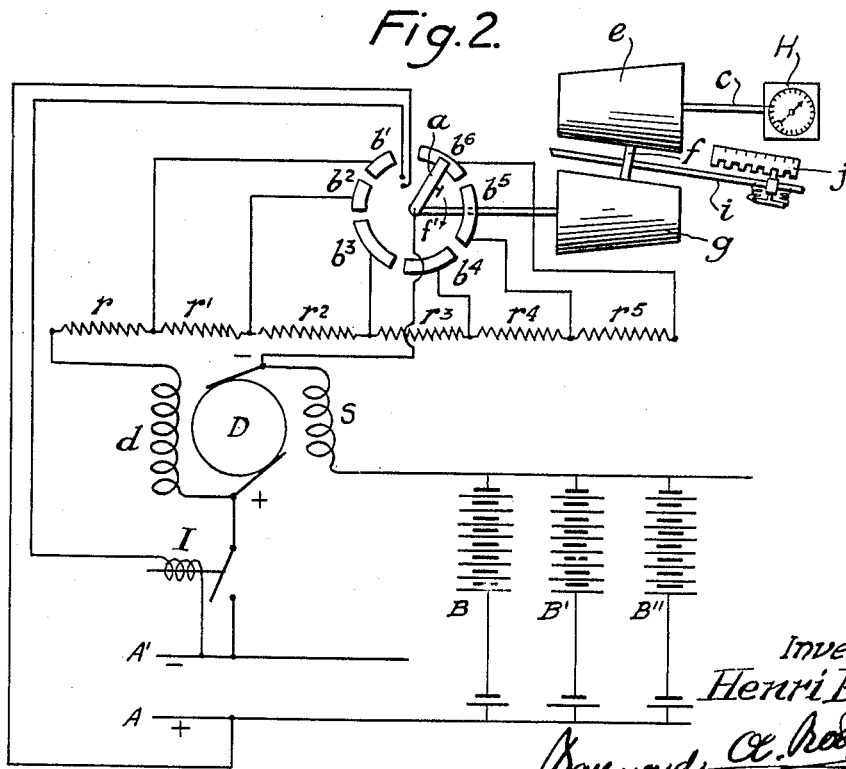

As an example and for purposes of illustration, two embodiments of the invention are shown in the attached drawing wherein:

Figure 1 relates to the use of an auxiliary battery of counter-electromotive force elements, and Figure 2 relates to the use of a direct current auxiliary generator.

The network is represented by the two conductors A and A' and the batteries to be charged by B, B', B''.

Referring to Figure 1, the auxiliary counter-electromotive force elements are represented at $e_1, e_2, e_3, e_4, e_5$ and $e_6$. They are constituted by lead plates dipping into a sulphuric electrolyte and absorb, as is well known, from 2.5 to 3 volts each. These elements are connected to the contacts $b_1, b_2, b_3, b_4, b_5, b_6$ and $b_7$ of a switch R the arm $a$ of which is actuated by a clockwork H regulated in known manner by means of a friction cone system adapted to rotate the arm of the switch, from the start of segment $b_7$ to the end of segment $b_1$, during the total time available for charging the batteries. To this end, the mechanism or clockwork H is constituted by a clock having a shaft $c$ connected to a cone $e$ the movement of which is transmitted frictionally through a roller $f$ to another cone $g$ the shaft of which drives the arm $a$ of the switch. The clockwork H is so designed that the duration of one turn of its shaft $c$ is equal to the average charging time of a battery. Whenever the roller $f$ is at the extreme left position, the rotational speed of the cone $g$ is at a minimum and corresponds to the maximum charging time of the batteries; inversely, whenever the roller is at the extreme right position, the cone $g$ revolves at its maximum speed, which speed corresponds to the shortest time adapted for charging batteries. The choice of the charging time is rather simple: it is only necessary to connect to the roller $f$ an index $i$ displaceable on a scale $j$ graduated in hours.

The functioning of the apparatus is as follows. The charging being started at the same time as the clockwork H, the arm $a$ of the switch R revolves in the direction of the arrow and gradually eliminates from the circuit the counter-electromotive force elements $e_6, e_5 \ldots e_1$, whereby the voltage at the terminals of batteries B, B', B'' varies between the required limits proportionally to the time, during the charging period. The opening of the charging circuit is effectuated by a switch I the tripping coil circuit of which is closed by the arm $a$ at the end of its travel.

In the example shown in Figure 2, an auxiliary compound dynamo D is disposed in series with the network A, A'. This compounding condition is necessary so that the voltage of the dynamo may remain independent of the charging current, variable as to time and variable also according to the state of the batteries to be charged. The series excitation circuit of the dynamo is represented by the character $s$. In the parallel excitation circuit $d$ is inserted an excitation rheostat the different resistances $r, r_1, r_2, r_3, r_4$ and $r_5$ of which are so calculated and designed as to regulate the dynamo in order to obtain the various voltages it is desired to successively apply to the batteries. The extremity of each of these resistances is connected to various conducting segments $b_1, b_2, b_3, b_4, b_5$ and $b_6$ of a switch R. Upon these segments the conducting switch arm $a$ contacts, said arm being connected to one pole of the dynamo. This arm is actuated by a clockwork H under the same conditions as previously described. The charge being started, as well as the clockwork H, the arm $a$ of the switch R will revolve in the direction of the arrow $f_1$ and, successively eliminating the resistances $r_5$, $r_4$ . . . $r_1$, increase the excitation current and, consequently, the voltage of the dynamo, this voltage varying between the required limits proportionally to time, during the charging period. Whenever the arm $a$ reaches the end of its travel, it closes the circuit of the tripping coil of switch I opening the charging circuit.

In the case described, the dynamo D functions as a booster. If the voltage of the network is above the final charging voltage of the batteries, the dynamo is arranged to act in a bucking direction by connecting its positive pole to the positive terminal of the network and the commutator is revolved in a direction opposite to that of the arrow $f_1$.

In the two embodiments of the invention, the resistance of the conductors connecting the batteries to be charged to the charging current source and the regulating devices should be sufficiently low so that the voltage at the terminals of these batteries will not be dependent upon the amperage of the charging current flowing through these conductors, in order that the voltage may remain practically equal to that of the source terminals.

I claim:

1. Automatic charging device for storage batteries, at tapering charging rate and predetermined period, by means of a direct current line the voltage of which is above the final voltage of the batteries when charged, device comprising a counter-electro-motive force battery of elements connected in circuit with the line and the batteries to be charged, a voltage reducer adapted to selectively vary the total number of said elements in the charging circuit, a clockwork mechanism actuating the said reducer in order to successively withdraw from the charging circuit the counter-electro-motive force elements, during the predetermined charging period, and a time switch opening the charging circuit at the end of the time fixed for charging.

2. In a system for charging storage batteries at a tapering charging rate in a predetermined period from a direct current constant tension source; an auxiliary electric current source connected in series circuit relation with the constant tension source and the batteries to be charged, means to vary the voltage of the auxiliary source as a function of time during the charging period, and a time switch adapted to open the charging circuit after the charging period.

3. In a system for charging storage batteries at a tapering charging rate in a predetermined period from a direct current constant tension source; a compound dynamo connected in series circuit relation with the constant tension source and the batteries to be charged, a regulating rheostat in the shunt excitation circuit of the compound dynamo, a clockwork mechanism actuating the rheostat in order to vary the voltage of the compound dynamo as a function of time during a predetermined time period choosed for charging and a time switch opening the charging circuit at the end of said predetermined charging period.

HENRI BÉNIT.